US007155570B1

(12) United States Patent
Singh et al.

(10) Patent No.: US 7,155,570 B1
(45) Date of Patent: Dec. 26, 2006

(54) FIFO WRITE/LIFO READ TRACE BUFFER WITH SOFTWARE AND HARDWARE LOOP COMPRESSION

(75) Inventors: Ravi P. Singh, Austin, TX (US); Charles P. Roth, Austin, TX (US); Gregory A. Overkamp, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 850 days.

(21) Appl. No.: 09/675,569

(22) Filed: Sep. 29, 2000

(51) Int. Cl.
*G06F 12/00* (2006.01)

(52) U.S. Cl. .......................... 711/118; 710/52; 710/54; 710/53; 710/56

(58) Field of Classification Search ................ 711/118, 711/169; 710/52, 54, 53, 56
See application file for complete search history.

(56) References Cited

U.S. PATENT DOCUMENTS

| 3,975,717 A | | 8/1976 | Panigrahi |
| 5,161,217 A | | 11/1992 | Lemay et al. |
| 5,553,010 A | * | 9/1996 | Tanihira et al. ............ 708/209 |
| 6,094,729 A | * | 7/2000 | Mann ......................... 714/25 |
| 2003/0115424 A1 | * | 6/2003 | Bachand et al. ............ 711/146 |

FOREIGN PATENT DOCUMENTS

| EP | 1 039 386 | 9/2000 |
| JP | 50-120529 | 9/1975 |
| JP | 51-050616 | 5/1976 |
| JP | 58-103047 | 6/1983 |
| JP | 02-072440 | 3/1990 |
| JP | 03-113646 | 5/1991 |
| JP | 05-100900 | 4/1993 |
| JP | 05-324396 | 12/1993 |
| JP | 11-306044 | 11/1999 |

* cited by examiner

*Primary Examiner*—Sanjiv Shah
*Assistant Examiner*—Midys Rojas
(74) *Attorney, Agent, or Firm*—Fish & Richardson P.C.

(57) ABSTRACT

In one embodiment, a trace buffer circuit for use with a pipelined digital signal processor (DSP) may include a series of interconnected registers that operate as a first-in first-out (FIFO) register on a write operation and a last-in first-out (LIFO) register on a read operation. On the write operation, a branch target/source address pair may be written to a first pair of trace buffer registers and, the contents of each register may be shifted two registers downstream. On the read operation, one instruction address may be read from a top register, and the contents of each register may be shifted one register upstream. The trace buffer may also include structure to enable compression of hardware and software loops in the program flow. A valid bit may be assigned to each instruction address in the trace buffer and a valid bit buffer with a structure parallel to that of the trace buffer may be provided to track the valid bits.

30 Claims, 6 Drawing Sheets

FIFO WRITE/LIFO READ TRACE BUFFER WITH SOFTWARE AND HARDWARE LOOP COMPRESSION

TECHNICAL FIELD

This invention relates to pipelined processors, and more particularly to a trace buffer for use with pipelined processors.

BACKGROUND

Digital signal processing is concerned with the representation of signals in digital form and the transformation or processing of such signal representation using numerical computation. Digital signal processing is a widely-used technology for many of today's high technology products in fields such as wireless communications, networking, and multimedia. One reason for the prevalence of digital signal processing technology has been the development of low cost, powerful digital signal processors (DSPs) that provide the reliable computing capability to implement these products cheaply and efficiently. Since the development of the first DSPs, DSP architecture and design have evolved to the point where even sophisticated real-time processing of video-rate sequences can be performed.

DSPs are often used for a variety of multimedia applications such as digital video, imaging, and audio. DSPs can manipulate the digital signals to create and open such multimedia files.

MPEG-1 (Motion Picture Expert Group), MPEG-2, MPEG-4 and H.263 are among digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
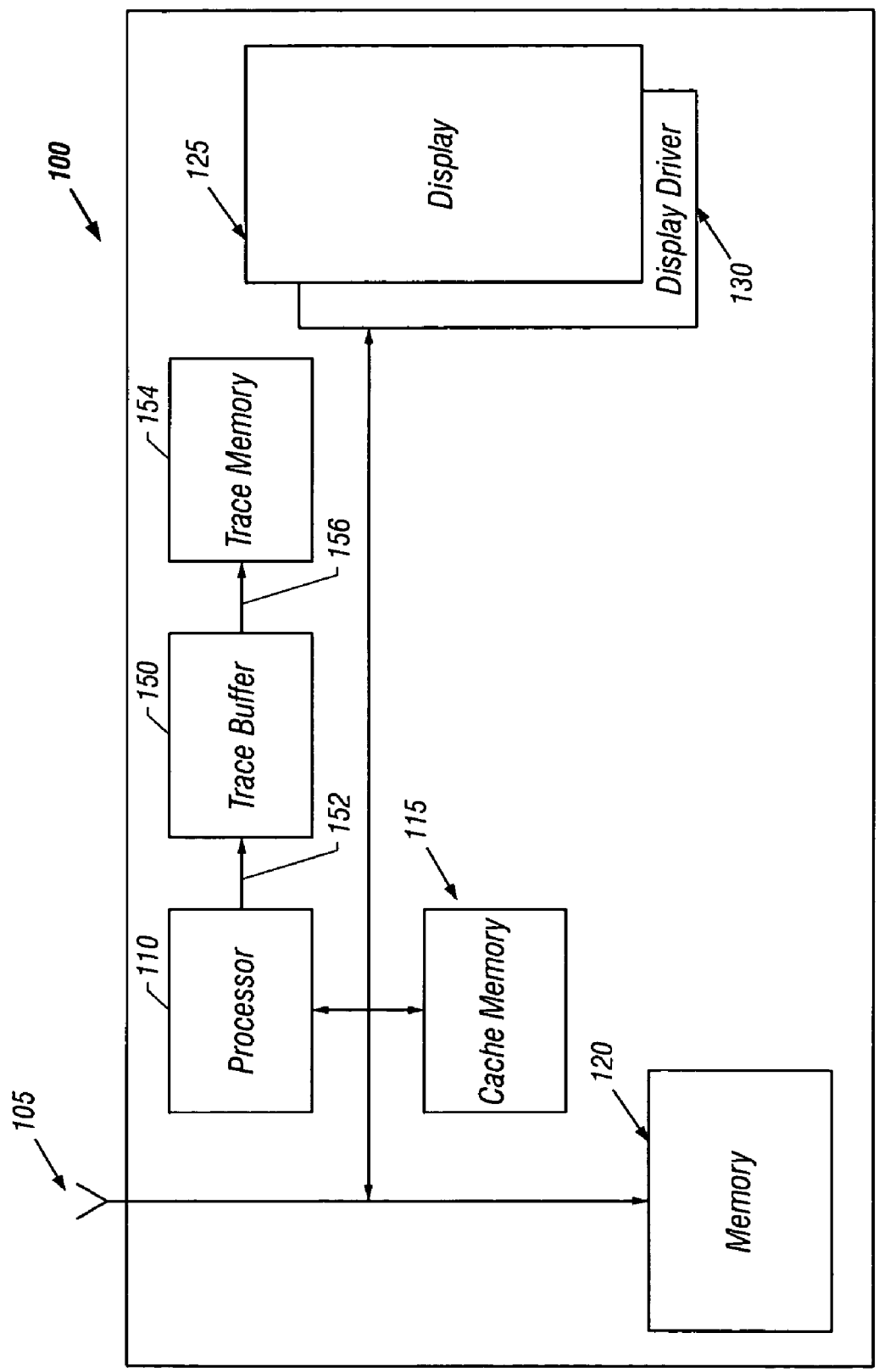
FIG. 1 is a block diagram of a mobile video device utilizing a processor according to an embodiment.

FIG. 1 illustrates a mobile video device 100 including a trace buffer 102 according to an embodiment. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with a hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, the pipelined DSP 110 may fetch the second instruction concurrently with execution of the first instruction, thereby improving instruction throughput. Further, the clock cycle of a pipelined DSP may be shorter than that of a non-pipelined DSP, in which the instruction is fetched and executed in the same clock cycle.

Such a DSP 110 is contemplated for use in video camcorders, teleconferencing, PC video cards, and High Definition Television (HDTV). In addition, the DSP 110 is also contemplated for use in connection with other technologies utilizing digital signal processing such as voice processing used in mobile telephony, speech recognition, and other applications.

Figure 2:
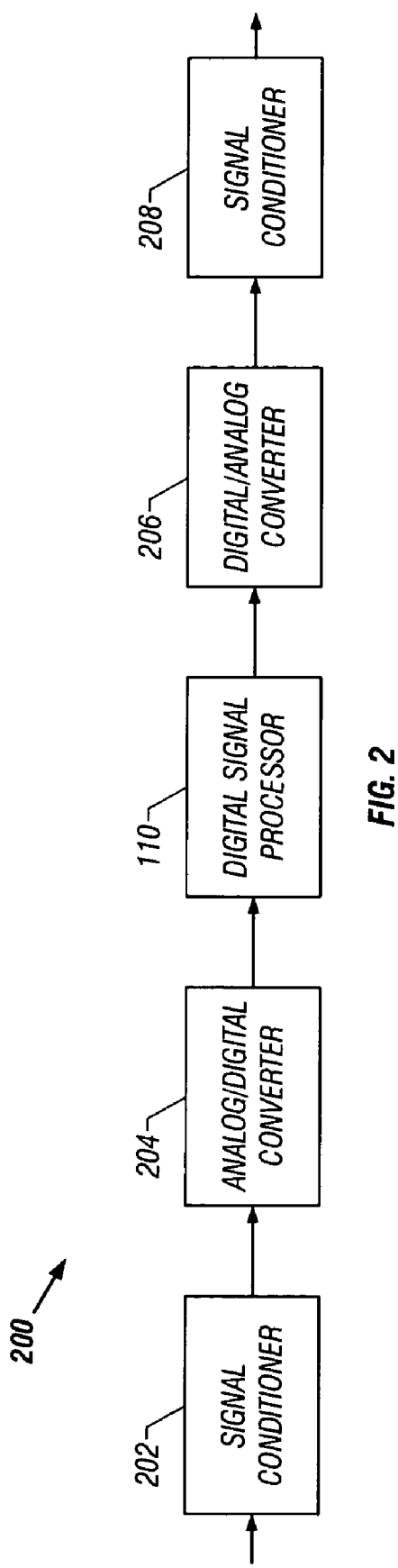
FIG. 2 is a block diagram of a signal processing system according to an embodiment.

FIG. 2 shows a block diagram of a signal processing system 200 including the DSP 110 according to an embodiment is shown. One or more analog signals may be provided by an external source, e.g., antenna 105, to a signal conditioner 202. The signal conditioner 202 is arranged to perform certain preprocessing functions on the analog signals.

Exemplary preprocessing functions may include mixing several of the analog signals together, filtering, amplifying, etc.

An analog-to-digital converter (ADC) 204 may be coupled to receive the preprocessed analog signals from signal conditioner 202 and may convert the preprocessed analog signals to digital signals formed of samples, as described above. The samples are taken according to a sampling rate determined by the nature of the analog signals received by the signal conditioner 202. The DSP 110 is coupled to receive digital signals at the output of the ADC 204. The DSP 110 may perform the desired signal transformation upon the received digital signals, producing one or more output digital signals. A digital-to-analog converter (DAC) 206 may be coupled to receive the output digital signals from the DSP 110. The DAC 206 converts the output digital signals into output analog signals. The output analog signals may then be conveyed to another signal conditioner 208. The signal conditioner 208 may perform post-processing functions upon the output analog signals. Exemplary post-processing functions are similar to the preprocessing functions listed above. Any suitable configuration of these devices may be coupled into a signal processing system 200 with the DSP 110.

Figure 3:
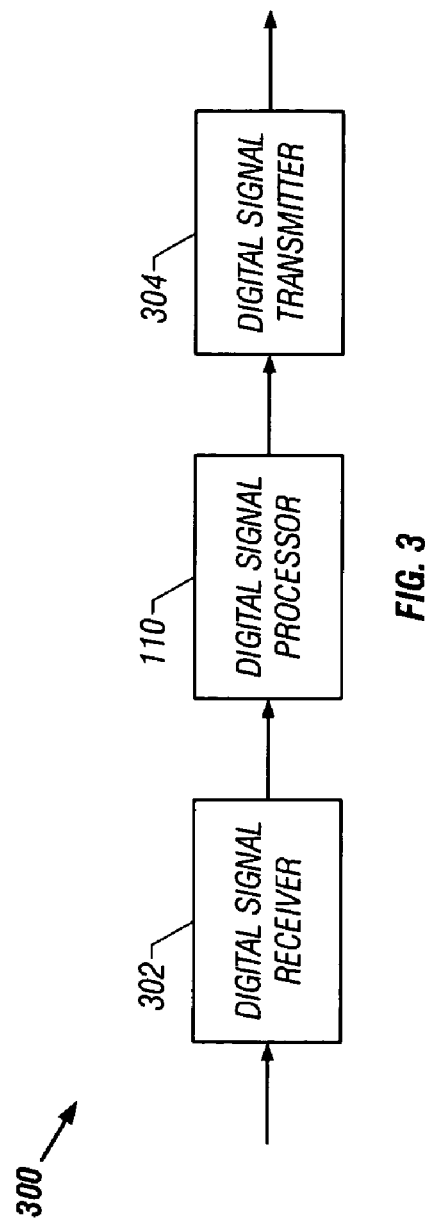
FIG. 3 is a block diagram of an alternative signal processing system according to an embodiment.

FIG. 3 shows a signal processing system 300 according to another embodiment. In this embodiment, a digital receiver 302 may be arranged to receive one or more digital signals and to convey the received digital signals to the DSP 110. As with the embodiment shown in FIG. 2, the DSP 110 performs the desired signal transformation upon the received digital signals to produce one or more output digital signals. A digital signal transmitter 304 may be coupled to receive the output digital signals. In one exemplary application, signal processing system 300 is a digital audio device in which the digital receiver 302 conveys signals to the DSP 110 digital indicative of data stored on a digital storage device 120. The DSP 110 may then process the digital signals and conveys the resulting output digital signals to digital transmitter 204. The digital transmitter 304 may then cause values of the output digital signals to be transmitted to the display driver 130 to produce a video image on the display 125.

Figure 4:
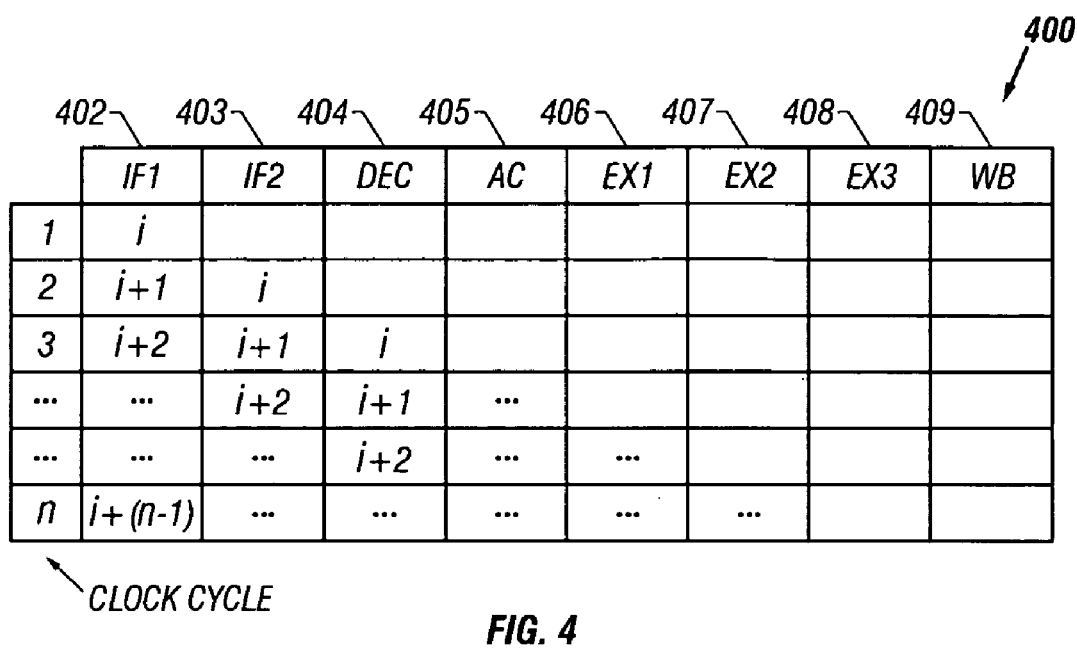
FIG. 4 illustrates exemplary pipeline stages of the processor in FIG. 1 according to an embodiment.

The pipeline illustrated in FIG. 4 may include eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, a new instruction must be fetched outside of the sequential program flow, making the remaining instructions in the pipeline irrelevant. Methods such as data forwarding, dynamic branch prediction, and associating valid bits with instruction addresses in the pipeline may be employed to deal with these complexities.

Trace buffers may store a processor's program counter (program flow) information. A trace buffer may be used as a debugging tool to recreate the path a program took during execution. When executing the program, certain instructions may produce an unexpected event. Such an unexpected event may cause a break in the program flow. Such events include, for example, dynamic branching based on a result or an interrupt triggered by another device in the system. These events may be difficult to predict from analyzing the code statically. The log of executed instructions (trace data) in the trace buffer may be used to determine when such an undesired event occurred when executing the code and what triggered it.

The trace buffer 150 (FIG. 1) may be connected to the DSP 110 by a write bus 152. The trace buffer 150 may store the addresses of fetched instructions in a series of interconnected registers. The stored addresses may be read out from the trace buffer 150 to a trace memory 154 on a read bus 156. The trace memory 154 may be internal or external to the DSP.

Figure 5:
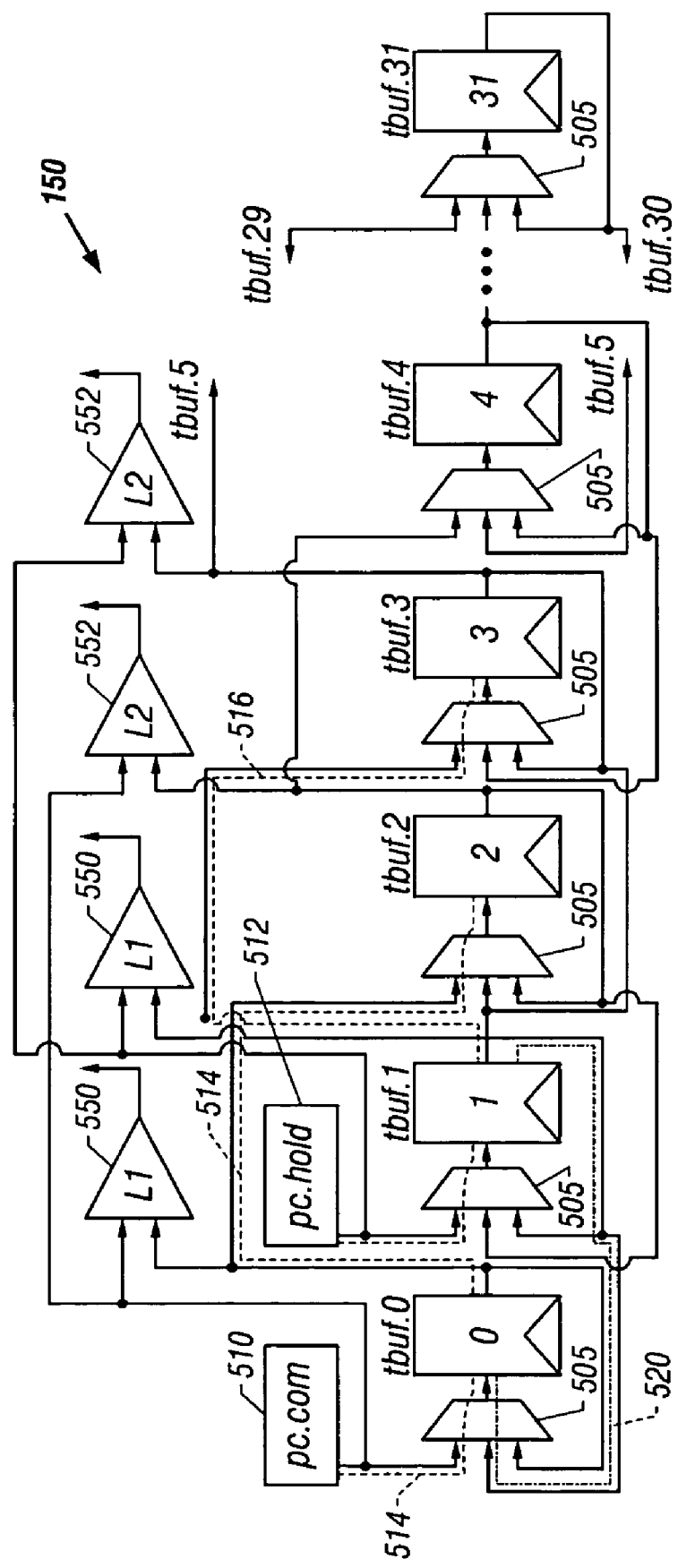
FIG. 5 is a block diagram of a trace buffer according to an embodiment.

FIG. 5 illustrates the structure of the trace buffer 500 according to an embodiment. The trace buffer 500 may store 32-bit instruction addresses in a series of thirty-two 32-bit trace buffer registers, designated tbuf.0 to tbuf.31, each with an associated input multiplexer (MUX) 505. According to an embodiment, the trace buffer 150 may have a 64-bit write bus 152 (FIG. 1) and a 32-bit read bus 156.

Program code is executed sequentially unless an event occurs, such as a taken branch or an interrupt, that causes the program counter (PC) to jump to another location in the code. Since the code between such jump events is sequential, the program flow may be reconstructed from a record of the jump events. In order to reduce the memory required for the trace buffer and its speed of operation, the trace buffer may only store the addresses of instructions that caused the program to jump or break, e.g., branch instructions, exceptions, interrupts, and the addresses of the target of the branch.

A branch may be a common jump event in a program flow. Each branch may be identified by a pair of addresses, a branch target address and a branch source address. The branch target address may be the address of the first instruction in the branched instruction set, and the branch source address is the address of either the instruction that generated the break of program flow or the last completed instruction.

The trace buffer 150 may operate as a first-in first-out (FIFO) register on a write operation. A branch target address and a branch source address for a branch may be written to the trace buffer simultaneously as a 64-bit word on the 64-bit write bus 152. The branch target address may be stored in a register 510, designated pc.com, which is connected to tbuf.0, and the branch source address may be written to a register 510, designated pc.hold, which is connected to tbuf.1. When the branch target address in the pc.com register 510 is written to tbuf.0, the branch target address currently stored in tbuf.0, if any, may be shifted to tbuf.2 following a write path 514. Similarly, when the branch source address in the pc.hold register 512 is written to tbuf.1, the branch source address currently stored in tbuf.1, if any, may be shifted to tbuf.3 following a write path 516. In subsequent write operations, the branch target address in tbuf.0 may be shifted to tbuf.2 and the branch target address in tbuf.2 will be shifted to tbuf.4. A similar shift occurs for the branch source address in tbuf.1 to tbuf.3, and the branch source address in tbuf.3 to tbuf.5. A similar shift may occur in the other trace buffer registers, that is, each instruction address in a trace buffer register may be shifted downstream two registers each write cycle.

The trace buffer may operate as a last-in first-out (LIFO) register for a read operation. Since the read bus 156 is 32-bit wide, the 32-bit branch target addresses and branch source addresses may be read out individually rather than as a pair. When the address in tbuf.0 is read out, the address in tbuf.1 may be shifted left (upstream) to tbuf.0 following a read path 520. Similarly, the addresses in the other registers are shifted upstream one register. A similar shift may occur in the other trace buffer registers, that is, each instruction address in a trace buffer register may be shifted upstream one register each read cycle.

When the trace buffer 150 is full, i.e., tbuf.30 and tbuf.31 are filled, the trace buffer may trigger a trace buffer full exception. The exception may be transmitted to an exception handler which may determine the exception to be a trace buffer exception and initiate a read operation to empty the contents of the trace buffer 150 into the trace memory 154. The exception handler may also halt the program flow while the trace buffer 150 is being read out to prevent the loss of trace information. The trace buffer may be read out in a memory map read (MMR) operation in which each address read out of tbuf.0 is stored in an area of memory specifically allocated for the contents of the trace buffer 150.

According to an alternate embodiment, when the trace buffer 150 is full, the trace buffer may not trigger a trace buffer full exception. Rather, the trace buffer 150, operating as a FIFO register, may drop off the addresses at the bottom of the trace buffer, i.e., the addresses may be shifted out of tbuf.30 and tbuf.31.

In order to further preserve trace buffer resources, and hence improve the performance level and speed at which the trace buffer 150 may operate, structure may be provided for compression of the traced code. The program flow may include software and hardware loops which could rapidly fill the trace buffer, increasing the frequency of readout operations, and hence slow performance of the trace gathering. While in an n-cycle loop, the branch target/source address pairs being stored are repeated n-times and hence may not provide significant information about program flow. Accordingly, it may be desirable to compress out repeated target/source address pairs.

Figure 6:
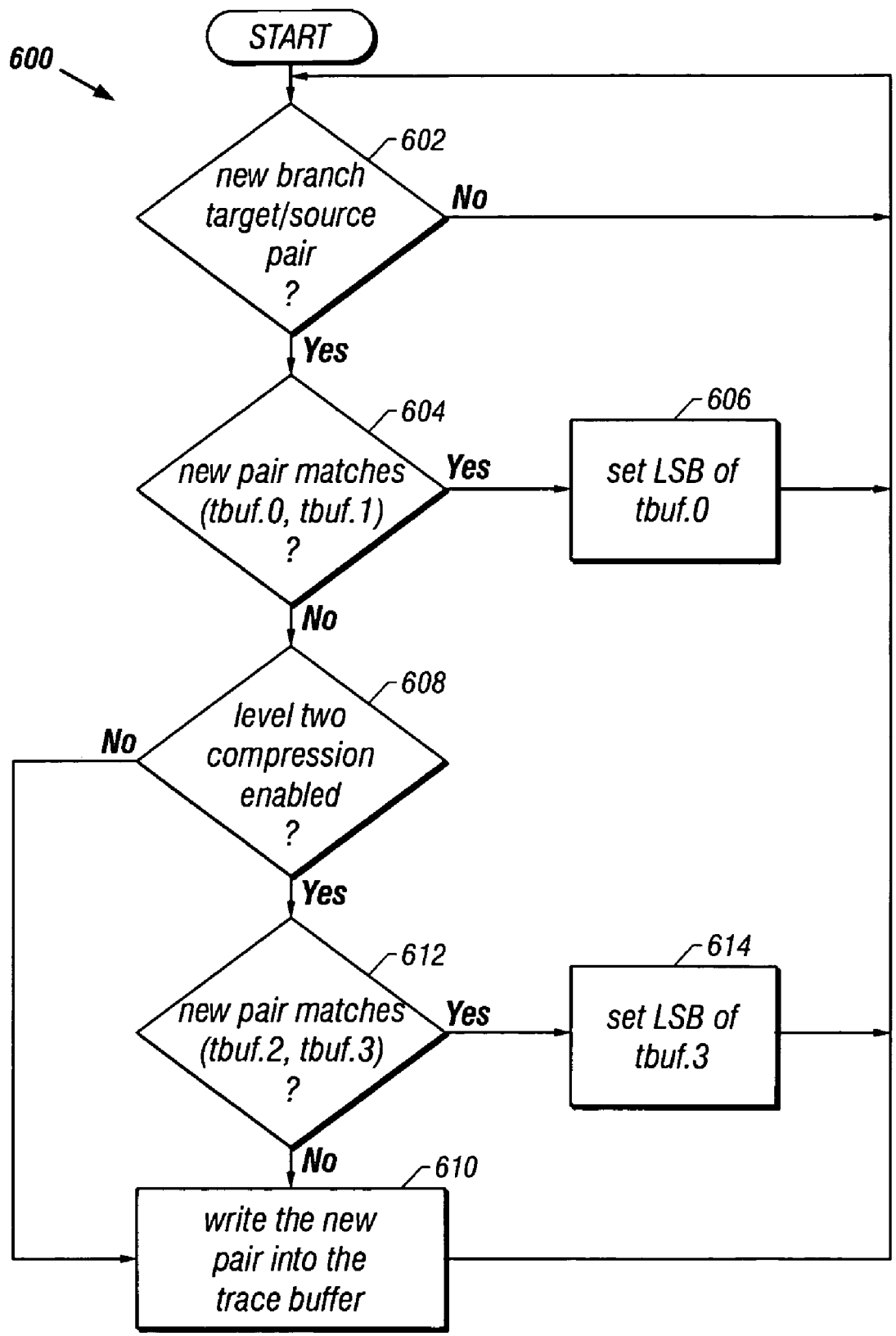
FIG. 6 is a flow chart illustrating a compression operation for the trace buffer in FIG. 5 according to an embodiment.

The trace buffer 150 may be enabled to conduct a level one compression and a level two compression, where the level one compression may be triggered by any loop, and the level two compression may be triggered by a loop containing a nested inner loop. FIG. 6 illustrates a flow chart describing an operation 600, including level one and level two compression. The following description is merely one embodiment of implementing the operation 600. In other embodiments, states may be skipped or performed in a different order.

When a new branch target commits, the branch target/source address pair may be stored in the pc.com and pc.hold registers, respectively, and the operation 600 may return to state 602. If the address pair in the pc.com and pc.hold registers is a new address pair, it may be compared to the stored address pair in tbuf.0 and tbuf.1 with level one comparators 550 in state 604.

According to an embodiment, the instruction addresses may have 16-bit boundaries. The least significant bits (LSBs) of the instruction addresses may therefore be zeros (0), and hence, provide no useful information. Accordingly, the LSBs of the instruction addresses may not be considered in the comparison between the new address pairs and the stored address pairs contained in tbuf.0 and tbuf.1.

According to an embodiment, the LSB of the branch target address in tbuf.0 may be used to indicate level one compression. If the address pairs match, the stored address pair in tbuf.0 and tbuf.1 may be compressed by setting the LSB of the branch target address in tbuf.0, which is typically zero (0), to one (1) in state 606. In this case, the new address pair is not written to the trace buffer.

If level two compression is determined not to be enabled in state 608, and the new and stored address pairs do not match, the new address pair may be written to tbuf.0 and tbuf.1 in state 610.

If level two compression is determined to be enabled in state 608, and the new and stored address pairs do not match, the new address pair in the pc.com and pc.hold registers may be compared to the address pair stored in tbuf.2 and tbuf.3 by level two comparators 552 in state 612. If the new address pair and the address pair stored in tbuf.2 and tbuf.3 match, the LSB of the branch source address in tbuf.3 may be set to one (1) in state 614. In this case, the new address pair is not written to the trace buffer.

If the new address pair and the address pair stored in tbuf.2 and tbuf.3 do not match, the new address pair may be written to the trace buffer in state 610.

Example 1 illustrates an exemplary level one compression operation.

| Instruction Address | Instruction |
| --- | --- |
| 0x2000 | I1 |
| 0x2002 | I2 |
| 0x2006 | I3 |
| 0x2008 | I4 |
| 0x200a | Branch to I2 if loop not expired |
| 0x200c | I5 |

The program flow in Example 1 includes a recurring loop which includes a branch at instruction address 0x200a (branch source address) to instruction I2 at instruction address 0x2002 (branch target address) until the loop expires. Once the loop expires, the PC falls out of the loop to instruction I5 at instruction address 0x200c.

After the first iteration of the loop, tbuf.0 contains instruction address 0x2002 (branch target address) and tbuf.1 contains instruction address 0x200a (branch source address). In the second iteration of the loop, the level one comparators 550 compare the new target/source address pair (0x2002, 0x200a) to the stored address pair in tbuf.0 and tbuf.1 (0x2002, 0x200a), disregarding the LSBs of the addresses. Since the new and stored address pairs match, the new address pair is not written to tbuf.0 and tbuf.1 and the LSB of the branch target address in tbuf.0 is set to one (1). Setting the LSB of the branch target address changes its value from 0x2002 to 0x2003.

In the third iteration of the loop, the level one comparators 550 compare the new address pair (0x2002, 0x200a) to the stored address pair in tbuf.0 and tbuf.1 (0x2003, 0x200a), disregarding the LSBs of the addresses. Since the address pairs match, the new address pair in the pc.com and pc.hold registers is not written to tbuf.0 and tbuf.1, and the address pair in tbuf.0 and tbuf.1 remains (0x2003, 0x200a).

Example 2 illustrates an exemplary level two compression operation.

| Instruction Address | Instruction |
| --- | --- |
| 0x2000 | I1 |
| 0x2002 | I2 |
| 0x2006 | I3 |
| 0x2008 | Branch to I2 if loop not expired |
| 0x200a | I4 |
| 0x200c | I5 |
| 0x2010 | Branch to I1 if loop not expired |
| 0x2014 | I6 |

The program flow in Example 2 includes a recurring outer loop which includes a branch at instruction address 0x2010 to instruction I1 at instruction address 0x2000, and an inner loop which includes a branch at instruction address 0x2008 to instruction I2 at instruction address 0x2002.

After the first iteration of the inner loop, tbuf.0 contains instruction address 0x2002 (branch target address) and tbuf.1 contains instruction address 0x200a (branch source address). In the second iteration of the inner loop, level one compression occurs, as described above in reference to Example 1, and the branch target address in tbuf.0, i.e., 0x2002, is set to 0x2003.

Once the inner loop expires, the PC falls out of the loop to instruction I4 at instruction address 0x200a until it encounters the branch instruction at instruction address 0x2010 to return to instruction I1. In the first iteration of outer loop, the branch target address of the outer loop, i.e., 0x2000, is written to tbuf.0, the branch source address of the outer loop, i.e., 0x2010, is written to tbuf.1, and the address pair (0x2003, 0x2008) in tbuf.0 and tbuf.1 is shifted to tbuf.2 and tbuf.3. The second time the inner loop is encountered in the second iteration of the outer loop, level two compression occurs. The level one comparators 550 compare the new address pair to the address pair stored in tbuf.0 and tbuf.1 (0x2000, 0x2010) in state 604 (FIG. 6). Since these do not match, the level two comparators 552 then compare the new address pair (0x2002, 0x2008) to the address pair stored in tbuf.2 and tbuf.3 (0x2003, 0x2008), disregarding the LSBs, in state 612. Since these address pairs match, the new address pair is not written to tbuf.0 and tbuf.1. A level two compression is indicated by setting the LSB of the source address in tbuf.3 from zero (0) to one (1), changing the stored instruction address value from 0x2008 to 0x2009.

In the second iteration of the outer loop, level one compression occurs on the outer loop. Level one comparators 550 compare the new address pair (0x2000, 0x2010) to the address pair stored in tbuf.0 and tbuf.1 (0x2000, 0x2010), disregarding the LSBs of the addresses. Since the new and stored address pairs match, the new address pair is not written to tbuf.0 and tbuf.1, and the LSB of the target address in tbuf.0 is set from zero (0) to one (1), changing the stored instruction address value from 0x2000 to 0x2001.

When the DSP 110 is restarted after a power-down, i.e., a power-on reset, the trace buffer 150 may contain invalid instruction addresses remaining from the program flow being executed before the DSP 110 was shut down. According to an embodiment, each instruction address in the trace buffer has an associated 1-bit valid bit. The valid bit indicates whether the instruction address in the trace buffer 150 is valid or invalid for the current program flow with a HIGH or LOW value, respectively. If the instruction address is invalid, it may not be written to the trace memory 154 in the read operation.

Figure 7:
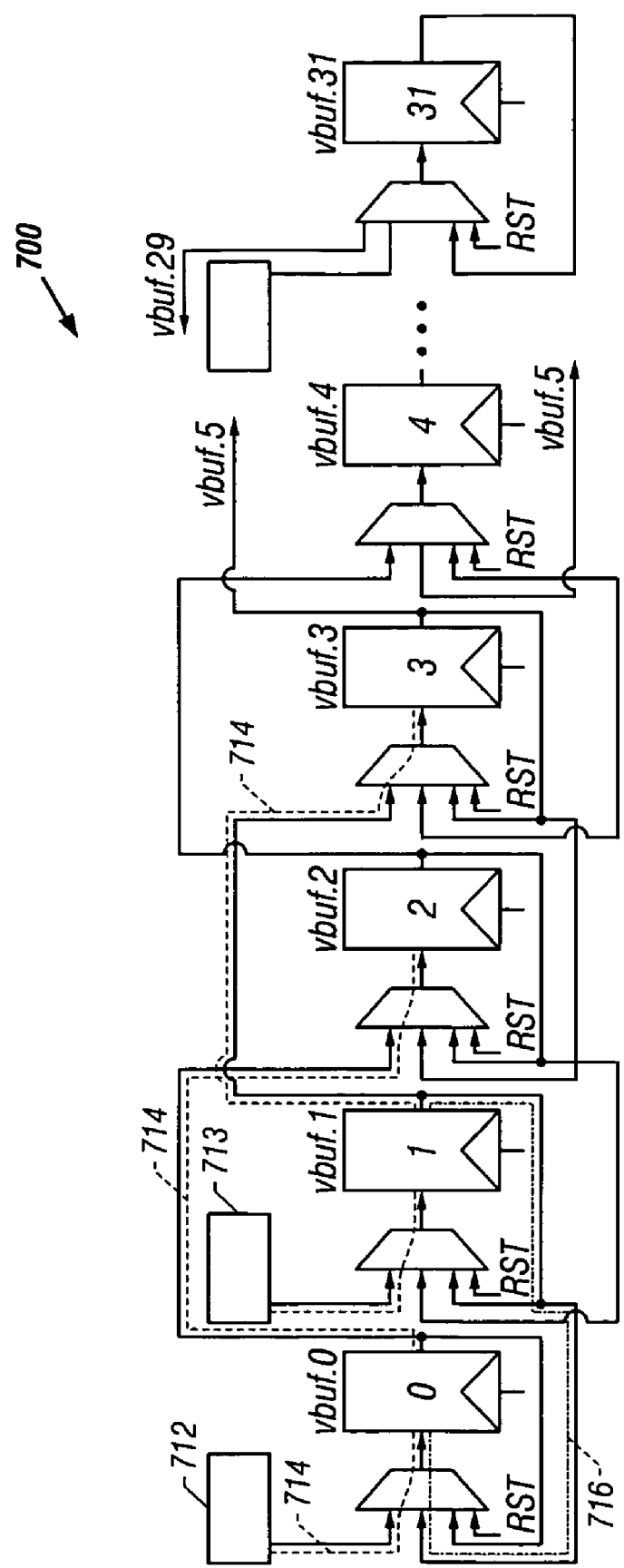
FIG. 7 is a block diagram of a valid bit buffer for the trace buffer of FIG. 5 according to an embodiment.

FIG. 7 illustrates a valid bit buffer 700 which may track the valid bits associated with instruction addresses in the trace buffer 150. The valid bit buffer 700 may have a structure which parallels that of the trace buffer 150, including thirty-two 1-bit flip-flops (FFs), designated vbuf.0 to vbuf31, each with an associated input MUX 705. The input MUX 705 for each valid bit buffer may include a reset gate 710. On a power-on reset, the valid bit in each valid bit buffer FF may be set to zero (0) to indicate that the corresponding instruction address in the trace buffer 150 is invalid.

The operation of the valid bit buffer may also parallel the operation of the trace buffer. On a write operation, the valid bit corresponding to the branch target address in the pc.com register 510 may be transferred from FF 712 to vbuf.0, and the valid bit corresponding to the branch source address in the pc.hold register 512 may be transferred from FF 713 to vbuf.1. Like the trace buffer 150, valid bits may be shifted two FFs along a write path 714 on a write operation, and shifted one FF along a read path 716 on a read operation. For each valid bit read out of vbuf.0, a 1-bit valid bit with a LOW value may be written to vbuf.31 by a valid bit generator 720 to replace the valid bit shifted to vbuf.30.

A trace buffer according to the various embodiments may advantageously generate precise exceptions while capturing all changes in the program flow. Further, the FIFO/LIFO organization of the trace buffer may require less multiplexing than that required for a FIFO-only or LIFO-only structure, thereby reducing space and power requirements for the trace buffer 150 on a chip.

A number of embodiments of the invention have been described. Nevertheless, it will be understood that various modifications may be made without departing from the spirit and scope of the invention. For example, instruction addresses having widths other than 32-bits, e.g., 16-bits or 64-bits, may be traced using a trace buffer with appropriately scaled trace buffer registers and read and write buses. Accordingly, other embodiments are within the scope of the following claims.

What is claimed is:

1. A trace buffer circuit comprising:
   a plurality of interconnected registers, including a first end register to input and output addresses of fetched instructions during a trace operation, a second end register, and a plurality of middle registers connected between said first end register and said second end register;
   a write path to shift an instruction address in one of said plurality of interconnected registers by two registers toward the second end register on a write operation;
   a first holding register;
   a second holding register;
   a first comparator to compare a new branch target address corresponding to a loop in the first holding register to a stored branch target address in the first end register;
   a second comparator to compare a new branch source address corresponding to the loop in the second holding register to a stored branch source address in a first adjacent register, said first adjacent register being connected to the first end register on a read path; and
   a compression indication circuit to generate a compression indicator in response to the new branch target address matching the stored branch target address and the new branch source address matching the stored branch source address.

2. The circuit of claim 1, further comprising:
   a read path to shift the instruction address by one register toward the first end register on a read operation.

3. The circuit of claim 1, wherein the trace buffer operates as a first-in first-out (FIFO) register on the write operation and a last-in first-out (LIFO) register on the read operation.

4. The circuit of claim 1, wherein the instruction address comprises a 32-bit word.

5. The circuit of claim 4, wherein each of the first and second end registers and the plurality of interconnected registers comprise a 32-bit register.

6. The circuit of claim 5, wherein the plurality of interconnected registers comprise thirty-two registers.

7. The circuit of claim 5, further comprising:
a 64-bit write bus to write a 64-bit address pair to the first end register and an adjacent register on the write operation; and
a 32-bit read bus to read a 32-bit instruction address from the first end register on the read operation.

8. The circuit of claim 1, wherein the compression indication circuit operates to set a least significant bit of the stored branch target address in response to the new branch target address matching the stored branch target address and the new branch source address matching the stored branch source address.

9. The circuit of claim 1, further comprising:
a second adjacent register in said plurality of registers, said second adjacent register being connected to the first adjacent register on the read path;
a third adjacent register in said plurality of registers, said third adjacent register being connected to the second adjacent register on the read path;
a third comparator to compare the new branch target address in the first holding register to a second stored branch target address in the second adjacent register; and
a fourth comparator to compare the new branch source address in the second holding register to a second stored branch source address in the third adjacent register,
wherein the compression indication circuit operates to generate a compression indicator in response to the new branch target address matching the second stored branch target address in the second adjacent register and the new branch source address matching the second stored branch source address in the third adjacent register.

10. The circuit of claim 9, wherein the compression indication circuit operates to set a least significant bit of the stored branch source address in the third adjacent register in response to the new branch target address matching the stored branch target address in the second adjacent register and the new branch source address matching the stored branch source address in the third adjacent register.

11. The circuit of claim 1, further comprising a valid bit buffer comprising:
a first end flip-flop to input and output valid bits from the valid bit buffer;
a second end flip-flop;
a plurality of interconnected flip-flops connected between said first end flip-flop and said second end flip-flop;
a write path to shift a valid bit in one of said plurality of interconnected flip-flops by two flip-flops to a downstream flip-flop on a write operation; and
a read path to shift the valid bit by one flip-flop toward an upstream flip-flop on a read operation.

12. A pipelined processor comprising:
a trace buffer circuit connected to the pipelined digital signal processor, said trace buffer circuit comprising:
a plurality of interconnected registers, including a first end register to input and output addresses of fetched instructions during a trace operation, a second end register, and a plurality of middle registers connected between said first end register and said second end register;
a write path to shift an instruction address in one of said plurality of interconnected registers by two registers toward the second end register on a write operation; and
a read path to shift the instruction address by one register toward the first end register on a read operation.

13. The processor of claim 12, wherein the trace buffer operates as a first-in first-out (FIFO) register on the write operation and a last-in first-out (LIFO) register on the read operation.

14. The processor of claim 12, wherein the instruction address comprises a 32-bit word.

15. The processor of claim 14, wherein each of the first and second end registers and the plurality of interconnected registers comprise a 32-bit register.

16. The processor of claim 15, further comprising:
a 64-bit write bus to write a 64-bit address pair to the first end register and an adjacent register on the write operation; and
a 32-bit read bus to read a 32-bit instruction address from the end first register on the read operation.

17. A method comprising:
performing a trace operation including storing an address pair corresponding to a loop in fetched instructions in a trace buffer; and
performing a compression operation including
comparing the stored address pair to a new address pair in fetched instructions, and
setting a least significant bit of an address in the stored address pair in response to the new address pair matching the stored address pair; wherein the address pair comprises a source address and a target address.

18. The method of claim 17, further comprising:
discarding the new address pair in response to the new address pair matching the stored address pair.

19. The method of claim 17, further comprising:
storing the stored address pair in a first pair of registers; and
comparing the new address pair to the stored address pair.

20. The method of claim 19, further comprising:
writing the new address pair to the first pair of registers in response to the new address pair not matching the stored pair.

21. The method of claim 19, further comprising:
comparing the new address pair to a second stored address pair in a second pair of registers adjacent the first pair of registers;
setting a least significant bit of an address in the second stored address pair in response to the new address pair matching the second stored pair; and
writing the new address pair to the first pair of registers in response to the new address pair not matching the second stored pair.

22. The method of claim 21, further comprising:
discarding the new address pair in response to the new address pair matching the second stored address pair.

23. The method of claim 21, wherein said address in the second address pair comprises a branch source address.

24. The method of claim 17, wherein said address in the address pair comprises a branch target address.

25. An apparatus, including instructions residing on a machine-readable medium, for use in a trace buffer, the instructions operable to cause a machine to:
perform a trace operation including storing an address pair corresponding to a loop in fetched instructions in the trace buffer; and
perform a compression operation including
comparing the stored address pair to a new address pair in fetched instructions, and setting a least significant bit of an address in the stored address pair in response to the new address pair matching the stored address pair; wherein the address pair comprises a source address and a target address.

26. The apparatus of claim 25, further comprising instructions causing the machine to;
discard the new address pair in response to the new address pair matching the stored address pair.

27. The apparatus of claim 25, further comprising instructions causing the machine to:
store the stored address pair in a first pair of registers; and
compare a new address pair to a stored address pair in the first pair of registers.

28. The apparatus of claim 27, further comprising instructions causing the machine to:
write the new address pair to the first pair of registers in response to the new address pair not matching the stored pair.

29. The apparatus of claim 27, further comprising instructions causing the machine to:
compare the new address pair to a second stored address pair in a second pair of registers adjacent the first pair of registers;
set a least significant bit of an address in the second stored address pair in response to the new address pair matching the second stored pair; and
write the new address pair to the first pair of registers in response to the new address pair not matching the second stored pair.

30. The apparatus of claim 29, further comprising instructions causing the machine to:
discard the new address pair in response to the new address pair matching the second stored address pair.

* * * * *